United States Patent [19]

Kranz

[11] 4,223,770

[45] Sep. 23, 1980

[54] SHAFT DRIVE ALTERNATELY FOR BOTH DIRECTIONS OF ROTATION

[75] Inventor: Walter Kranz, Taufkirchen, Fed. Rep. of Germany

[73] Assignee: Messerschmitt-Bölkow-Blohm GmbH, Fed. Rep. of Germany

[21] Appl. No.: 959,143

[22] Filed: Nov. 9, 1978

[30] Foreign Application Priority Data

Nov. 29, 1977 [DE] Fed. Rep. of Germany ....... 2753106

[51] Int. Cl.² ............................................. F16D 47/06
[52] U.S. Cl. ..................................... 192/0.07; 60/718; 192/098; 192/85 AA; 415/61; 415/123; 192/85 F; 192/87.14; 192/87.18
[58] Field of Search ................... 192/0.07, 87.1, 0.096, 192/87.13, 0.098, 87.17, 87.15, 87.18, 87.17, 91, 85 A, 85 AA, 85 F; 415/61, 123, 202; 60/697, 718

[56] References Cited

U.S. PATENT DOCUMENTS

| | | | |
|---|---|---|---|
| 1,902,311 | 3/1933 | Reavis et al. | 60/718 X |
| 1,907,171 | 5/1933 | Anderson | 60/718 X |
| 2,137,934 | 11/1938 | White | 60/718 X |
| 2,526,424 | 10/1950 | Sawyer et al. | 415/61 X |
| 3,099,433 | 7/1963 | Wagner et al. | 415/61 X |
| 3,506,372 | 4/1970 | Conrad | 415/61 |
| 3,825,367 | 7/1974 | Lewis | 415/123 X |
| 4,066,381 | 1/1978 | Earnest | 415/202 |

Primary Examiner—C. J. Husar
Assistant Examiner—Moshe I. Cohen
Attorney, Agent, or Firm—McGlew and Tuttle

[57] ABSTRACT

A shaft drive alternately for both directions of rotation, comprises, a shaft rotatably supported on bearings having first and second turbines connectable thereto, each including a respective first and second turbine wheel freely rotatable on the shaft in respective opposite first and second directions. The turbine wheels are driven by fluid which rotates the wheels in a selected direction and, in addition, displaces the turbine wheels so that a friction disc carried thereby is engaged with a respective first and second clutch to connect it to the shaft to impart the selected direction of rotation. When the turbine is stopped by not directing the fluid into the blades, in which case the clutch mechanism is moved out of engagement and the turbine wheel may run free of the shaft, the second turbine wheel may be connected in a similar manner by effecting engagement of the associated second clutch with the shaft when the fluid is directed to the second turbine for rotating the turbine wheel.

8 Claims, 5 Drawing Figures

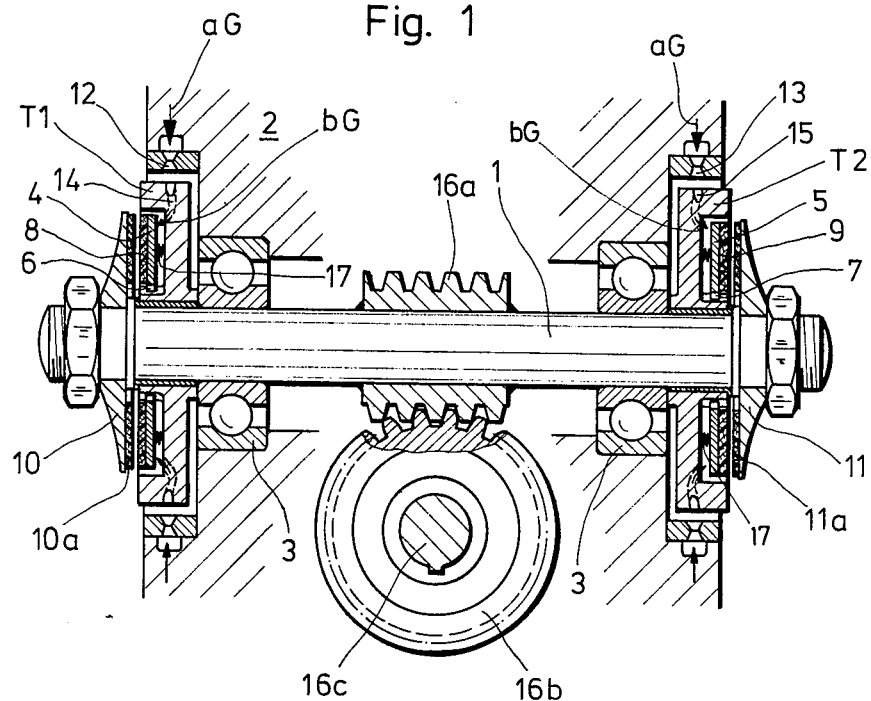

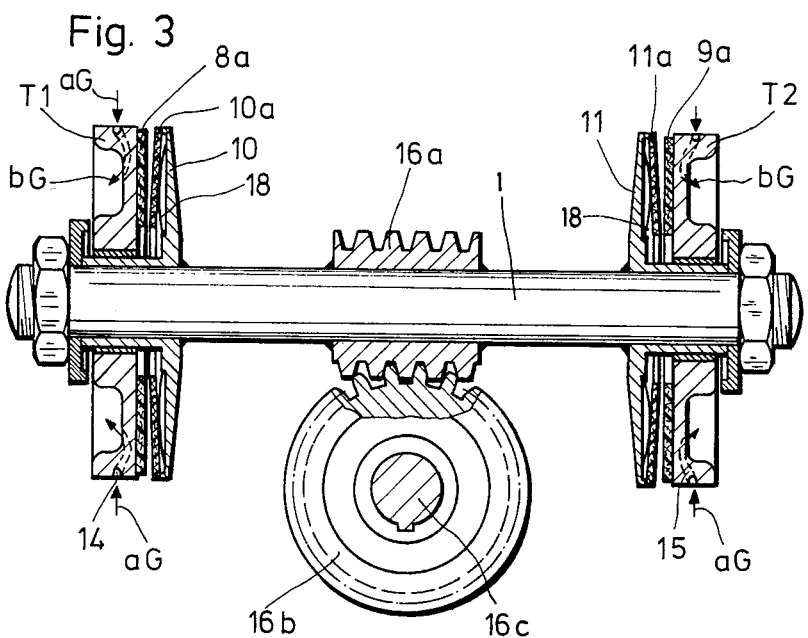
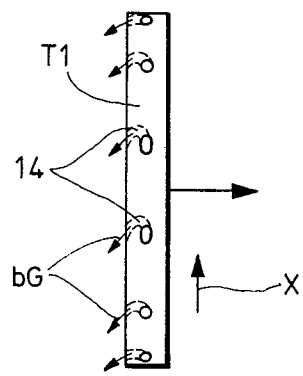
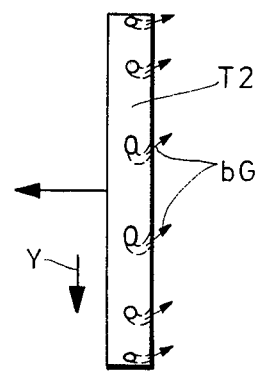
Fig. 3
Fig. 4a
Fig. 4b

SHAFT DRIVE ALTERNATELY FOR BOTH DIRECTIONS OF ROTATION

FIELD AND BACKGROUND OF THE INVENTION

This invention relates to shaft drives in general and, in particular, to a new and useful shaft drive which alternately drives in both directions of rotation by means of two turbines, each of which drives in one direction of rotation of the shaft.

DESCRIPTION OF THE PRIOR ART

Reversible shaft drives and shiftable friction clutches are known in various designs in reversing gears used in engineering construction, e.g., in power craft engineering, machine tool engineering and marine engineering. A special reverse gear shaft which is coupled, if necessary, with the drive by claw clutches running on splined shafts is arranged inside a reduction gear. When the direction of rotation is changed, one shafting, which is still running, must be decelerated until it stands still and the other shafting can then be accelerated.

SUMMARY OF THE INVENTION

The present invention provides a shaft drive with reduced inertia which can be shifted rapidly in both directions of rotation.

According to the invention, a shaft drive which rotates alternately in both directions of rotation, includes two turbines, one turbine each for each direction of rotation of the shaft. In this way, the wheels of the turbines are mounted for free rotation on the driven shaft and can be temporarily coupled by friction connection with the shaft by a clutch which is operated automatically by the turbine drive.

This has the effect that, with rapidly following changes in the direction of rotation of the shaft, the turbine wheel, which is uncoupled from the drive at the time and, hence, is not driving the shaft at the moment, can immediately take over the shaft drive in the respective direction, after another change of direction of the shaft, while it is still running. In other words, with each reversal of the direction of rotation of the shaft, the turbine wheel driving the shaft need not be braked with the shaft, so that its kinetic energy remains stored for the next drive. The invention thus not only maintains energy, but additionally increases the following angular acceleration by the stored energy. According to the laws of dynamics, the kinetic energy increases with the square of the angular acceleration, which is proportional to the radius and, therefore, has an effect, in particular, on the turbine wheels with their relatively large diameters.

The invention is particularly suitable, e.g., for driving the flow vane of guided missiles. Frequently, vane deflections rapidly following each other are required in various sizes and alternately in both directions, and relatively high powers are needed, due to the relatively high speeds and the necessary vane frequency. Therefore, it seems the more important to save and to reuse the energy already held in a waiting position, which remains stored in the rotating turbine wheels.

According to one feature of the invention, a clutch disc is connected with each turbine wheel fixed on the shaft non-rotatably, but axially movable or displaceable, where one end face, with the clutch engaged, is admitted by the turbine exhaust gases, and the other end face is designed as a clutch face which is in engagement with a driver plate fixedly assigned to the shaft.

Another feature of the invention consists in that one end face of the above-described clutch disc is admitted by the turbine driving gases with the clutch engaged. To this end, the turbine wheel has an axial ring flange with an internal driver gearing on its outer circumference, which meshes with a counter-gearing provided on the outer circumference of the clutch disc.

According to another feature of the invention, the turbine wheels, freely rotating on the shaft, are also axially displaceable, wherein one end face also serves as a clutch disc, which is pressed by the axial turbine thrust on the driver plate secured on the shaft.

Due to the above-mentioned arrangement of the turbine wheels and the operation of the clutch discs by means of the turbine exhaust or fresh gases, the driver clutches are also engaged in an advantageous manner with the drive, and the clutches are disengaged again when the turbine drive is shut off.

The invention is not confined to friction clutches, and the friction clutches can be replaced in a known manner with, for example, magnetic clutches.

Accordingly, an object of the present invention is to provide a shaft drive which comprises a shaft which is rotatably supported on a bearing and which carries first and second turbines thereon which are freely rotatably supported on the shaft, and which are driven by respective pressure fluids acting to drive them in respective first and second opposite directions and which include clutch means which become engageable with the respective first and second turbines alternatively when the turbine is driven by pressure fluid and which includes means to disengage the clutch means so that the turbine may run freely of the associated shaft.

A further object of the invention is to provide a shaft drive which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a transverse, sectional view of a shaft drive constructed in accordance with the invention;

FIG. 2 is a view similar to FIG. 1 of another embodiment of shaft drive;

FIG. 3 is a view similar to FIG. 1 of another embodiment of the invention; and

FIGS. 4a and 4b are top plan views of the turbine wheels shown in the various embodiments, indicating the direction of rotation and the direction of fluid pressure gases which operate the respective wheels.

DESCRIPTION OF THE PREFERRED EMBODIMENTS

In the invention according to FIG. 1, a continuous shaft 1 is rotatably mounted in a machine casing 2 on roller bearings 3. Clutch discs 4 and 5 which are displaceable in axial directions are mounted non-rotatably over driver gearings 6 and 7 on the respective hubs of each turbine wheel T1 and T2. The clutch discs 4 and 5 are provided with respective friction linings 8 and 9 which are arranged axially opposite driver plates 10 and 11. The driver plates 10 and 11 have respective friction linings 10a and 11a, and they are rigidly connected with shaft 1.

Guide nozzles 12 and 13, through which the turbine driving gases aG are conducted centripetally to turbine blade channels 14 and 15 are arranged in machine casing 2. As can be seen from FIGS. 4a and 4b, one turbine wheel T1 rotates in direction x and the other turbine wheel T2 rotates in direction Y. Turbine channels 14 and 15 each terminate behind respective clutch discs 4 and 5. A driven worm 16a which meshes with a driven worm 16b of a driven shaft 16c is arranged in the center of shaft 1.

The shaft drive with the two turbines, as well as the two clutches works as follows (See FIG. 1):

Assuming that turbine wheel T1 is running at the time, the turbine exhaust gases bG press clutch disc 4 against driver plate 10, so that shaft 1 runs with worm drive 16a, 16b and driven shaft 16c in the direction X. If the direction of rotation of shaft 1 is now to be reversed, the pressure gas supply to turbine wheel T1 is stopped so that clutch disc 4 is returned by tension springs 17 away from, and is disengaged from, driver plate 10. Due to the self-locking worm drive 16a, 16b, shaft 1 comes rapidly to a standstill, while turbine wheel T1 continues to run with clutch disc 4 on shaft 1.

If the drive is changed by turbine wheel T2 to rotate in direction Y, shaft 1 and worm drive 16a, 16b will run over the associated friction clutch 5, 9, 11a with drive shaft 16c in this direction Y also. When this driving push is completed, shaft 1 will rapidly stop again due to the self-locking of worm drive 16a, 16b, while both turbine wheels T1 and T2 continue to run in their own directions of rotation. It is irrelevant whether the next driving push is exerted on turbine wheel T1 or on turbine wheel T2. In either case, driving energy is saved and the acceleration phases are shortened.

According to FIG. 2, the turbine driving gases aG are fed centrally and flow through the turbines from the inside to the outside (centrifugally). Turbine wheels T1' and T2' have an axial ring flange 19 with a driver gearing 6a and 7a fixed radially on the outside, which mesh with counter-gearings on clutch discs 4a and 5a, so that clutch discs 4a and 5a are connected with turbine wheels T1 and T2 non-rotatably, but are axially displaceable.

According to FIG. 3, turbine wheels T1" and T2" are not only rotatable on shaft 1, but they are also axially displaceable. The wheels are provided on one end face with friction linings 8a and 9a which engage friction linings 10a and 11a on driver plates 10 and 11, respectively, when the turbine is in operation (driven). The turbine wheels are axially adjusted by their own axial thrust during operation. A curved return spring 18, arranged under friction linings 8a and 9a ensures that the respective turbine wheel T1 or T2 detaches itself from its adjacent driver plate 10 or 11 after each driving push and, thus, can continue to run in the intended direction of rotation, without any friction losses to store the inherent energy.

While specific embodiments of the invention have been shown and described in detail to illustrate the application of the principles of the invention, it will be understood that the invention may be embodied otherwise without departing from such principles.

What is claimed is:

1. A shaft drive, comprising, bearing means, an output shaft rotatably supported on said bearing means, first and second turbines comprising respective first and second turbine wheels freely rotatable on said output shaft for rotation in respective opposite first and second directions, means to direct fluid to said first and second turbine wheels selectively and alternatively to rotate said wheels in respective first and second opposite directions, first clutch means connected to said shaft and being connectable with said first turbine wheel to drive said output shaft in said first direction of rotation, second clutch means connected to said output shaft and being connectable with said second turbine wheel to drive said output shaft in a second direction of rotation, said means to direct fluid to respective ones of said first and second turbine wheels being effective to engage respective first and second clutch means with said respective first and second turbine wheels, said first and second clutch means being disengaged when said means to direct fluid to said turbine is stopped.

2. A shaft drive, as claimed in claim 1, wherein said first and second clutch means includes respective first and second clutch discs affixed to said shaft for rotation therewith, each of said first and second turbine wheels having respective counter clutch and disc, said respective first and second turbine wheels being displaceable so as to engage the counter-clutch disc with the associated first and second clutch disc connected to said shaft.

3. A shaft drive, as claimed in claim 2, wherein said means to direct fluid to said turbine wheel acts on said turbine wheel to direct said counter-clutch disc and said clutch disc of each of said first and second turbine wheels into engagement during driving of said turbine wheels.

4. A shaft drive, as claimed in claim 3, wherein said first and second turbine wheels include a hub portion having an internal driving gear connected to said counter-clutch disc.

5. A shaft drive, as claimed in claim 1, wherein said clutch means includes first and second clutch discs affixed to said shafts and arranged alongside said first and second turbine wheels, said first and second turbine wheels including internal gear means, first and second counter-clutch discs engaged on said internal gear means for rotation with the respective first and second turbine wheels, said means to direct fluid to said turbine wheels including turbine passages in said first and second turbine wheels oriented to direct the fluid past said counter-clutch disc and to urge them into engagement with the respective first and second clutch disc when said means to direct fluid to said turbine wheel is effective.

6. A shaft drive, as claimed in claim 1, wherein said first and second turbine wheels are freely rotatable in respect to said shaft and are mounted on and adjacent each end of said shaft, said clutch means including a fixed clutch disc connected to each end of said shaft alongside respective first and second turbine wheels and including first and second counter-discs carried by said turbine wheels and biased in a direction toward said fixed clutch discs, said means to direct fluid to said turbines including means to direct said first and second clutch discs into engagement with said respective first and second fixed clutch discs.

7. A shaft drive, as claimed in claim 6, including spring means for urging said counter-clutch discs in a direction opposite to the associated first and second fixed clutch discs.

8. A shaft drive, as claimed in claim 7, wherein said spring means comprises a curved return spring acting on said counter-discs on a side thereof to urge it in a direction toward said fixed clutch discs.

* * * * *